Figure 1:
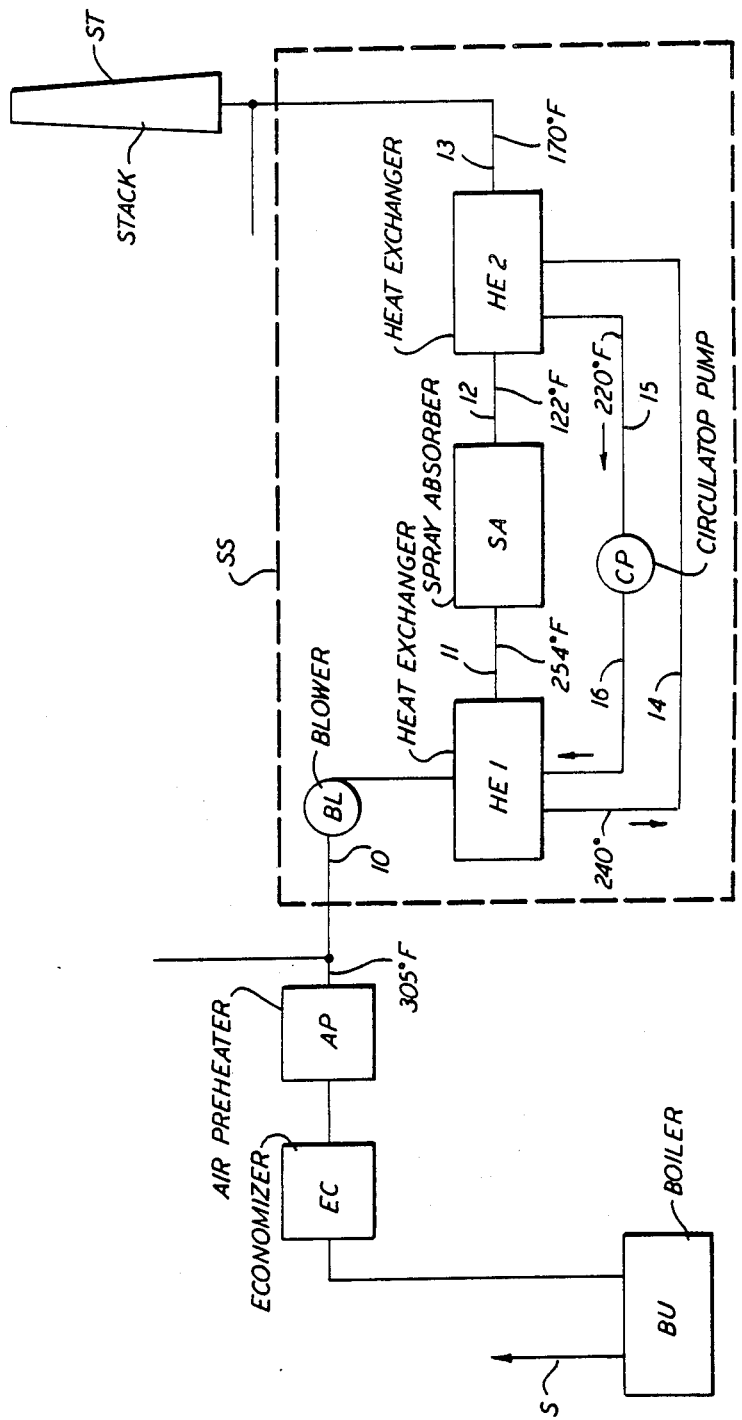

United States Patent [19]

Warner

[11] Patent Number: 4,705,101

[45] Date of Patent: Nov. 10, 1987

[54] FLUE GAS REHEAT APPARATUS

[75] Inventor: Donald F. Warner, Latham, N.Y.

[73] Assignee: Heat Exchanger Industries, Inc., Latham, N.Y.

[21] Appl. No.: 842,276

[22] Filed: Mar. 21, 1986

Related U.S. Application Data

[60] Continuation-in-part of Ser. No. 671,494, Nov. 14, 1984, Pat. No. 4,577,380, which is a division of Ser. No. 406,774, Aug. 10, 1982, Pat. No. 4,487,139, which is a continuation-in-part of Ser. No. 252,297, Apr. 9, 1981, abandoned, and a continuation-in-part of Ser. No. 81,789, Oct. 4, 1979, abandoned.

[51] Int. Cl.$^4$ .................... F28D 15/00; F28F 19/04
[52] U.S. Cl. ............................ 165/104.31; 55/222; 165/111; 165/133; 165/909; 165/913
[58] Field of Search ............... 165/133, 111, 921, 913, 165/909, 104.31, 5; 55/222, 87

[56] References Cited

U.S. PATENT DOCUMENTS

| | | | |
|---|---|---|---|
| 2,838,287 | 6/1958 | Kuhner | 165/921 |
| 3,050,786 | 8/1962 | St. John et al. | 165/133 |
| 4,444,128 | 4/1984 | Monro | 165/5 |

Primary Examiner—Albert W. Davis, Jr.
Attorney, Agent, or Firm—Richard G. Stephens

[57] ABSTRACT

Flue gas is passed through a first heat exchanger, a wet scrubber, and a second heat exchanger. The first heat exchanger supplies heated liquid to the second heat exchanger to reheat the flue gas. The first heat exchanger comprises, and the second heat exchanger ideally comprises, a plurality of fluoroplastic-covered metal tubes extending through a fluoroplastic-lined gas passage.

5 Claims, 1 Drawing Figure

FLUE GAS REHEAT APPARATUS

This application is a continuation-in-part of my copending application Ser. No. 671,494 filed Nov. 14, 1984, now U.S. Pat. No. 4,577,380 granted Mar. 25, 1986 which is a division of Ser. No. 406,774 filed Aug. 10, 1982, now U.S. Pat. No. 4,487,139 granted Dec. 11, 1984 which is a continuation-in-part of Ser. No. 252,297 filed Apr. 9, 1981 now abandoned and Ser. No. 81,789 filed Oct. 4, 1979 now abandoned.

This invention relates to flue gas scrubbing and reheating apparatus, and more particularly, to improved method and apparatus which provides important economic advantages. Many electric generating plants use coal-fired boilers to produce turbine steam. The flue gas produced by coal-fired boilers contains substantial amounts of sulfur dioxide, sulfur trioxide, and particulate matter such as fly ash. In order to decrease pollution, the flue gas is commonly passed through a spray absorber, or "wet scrubber", where it is mixed with water and a scrubbing liquor. Various forms of wet scrubbers are well known, and some are described in Chapter 3 of "Pollution Engineering Practice Handbook" by Cheremisinoff and Young, Ann Arbor Science Publishers, Inc., Ann Arbor, Mich. Flue gas which has passed through a wet scrubber ordinarily has a temperature of the order of 120° F. A substantially higher gas temperature is required to provide adequate stack bouyancy for desired or required pollution dispersion. Pollution dispersion is deemed particularly important in the case of large boiler installations, such as those of public utilities, where very large amounts of flue gas are produced. It has been common to route flue gas exiting from a scrubber through a heat exchanger to reheat the flue gas to a temperature of say 170° F. before passing the flue gas to a stack. The heat exchanger commonly uses some of the steam produced by the boiler to reheat the scrubbed flue gas. The use of that steam for reheating scrubbed flue gas disadvantageously decreases the amount of steam available for generation of electric power. One object of the present invention is to provide improved flue gas treatment method and apparatus wherein heat required to reheat scrubbed flue gas is not obtained from boiler steam, but rather by extraction of heat from the flue gas prior to scrubbing.

In one prior experimental system, water is circulated between a first heat exchanger through which the flue gas passes before it reaches the scrubber, and a second heat exchanger through which the flue gas passes after it leaves the scrubber. The first heat exchanger supplies heated water to the second heat exchanger to reheat the flue gas. The first heat exchanger may be called the "hot side heat exchanger", and the second heat exchanger may be called the "cold side heat exchanger". The present invention is an improvement over that mentioned experimental system.

In the mentioned prior experimental system, the more the heat which the cold side heat exchanger extracts from the circulating water, the cooler the water returned to the hot side heat exchanger. If the temperature of the water returned to the hot side heat exchanger falls below the acid dewpoint of the flue gas passing through the hot side heat exchanger, the formation of acid tends to corrode the hot side heat exchanger. The acid dewpoint typically falls within the range of 240°-275° F. for flue gas produced by coal-fired boilers. One may avoid corrosion of the hot side heat exchanger by insuring that the cold side heat exchanger does not reduce circulating water temperature below the acid dewpoint, of course, but that disadvantageously decreases the amount the flue gas can be reheated by the cold side heat exchanger. In order to provide adequate stack bouyancy, the cold side heat exchanger has been operated so that the temperature of the water returned to the hot side heat exchanger often has fallen below the acid dewpoint, resulting in acid formation and corrosion. To resist, though not eliminate, corrosion, the hot side heat exchanger was formed using an expensive alloy, Inconel 625 (trademark). Some objects of the present invention are to provide improved flue gas reheating method and apparatus which do not require use of expensive alloys, and in which corrosion of the hot side heat exchanger is not merely reduced, but virtually eliminated. Another object of the invention is to provide improved flue gas reheating method and apparatus wherein the cold side heat exchanger can extract a maximum desired amount of heat from the circulating water.

The hot side heat exchanger of the mentioned prior experimental unit must be periodically flushed with water to remove deposits of acid and particulates, both to lessen corrosion and to prevent loss of heat transfer. A further object of the present invention is to provide improved method and apparatus in which water flushing may be done much less frequently and thoroughly without affecting heat transfer.

While the flue gas passing through the cold side heat exchanger of the experimental unit has been scrubbed, enough pollutants remain in that gas that deposits have tended to build up in that heat exchanger, requiring the use of steam-operated soot blowers in that heat exchanger. Another object of the invention is to provide improved flue gas reheating method and apparatus wherein soot blowers are not required in the cold side heat exchanger.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a block diagram illustrating a preferred form of the present invention.

Referring to FIG. 1, a conventional coal-fired boiler BU having a gas temperature of say 1500° F. produces steam which is fed via a steam line S to one or more steam turbines (not shown). The flue gas exiting from boiler BU is shown passing through a conventional economizer EC and a conventional air preheater AP, which cool the flue gas to a temperature of the order of 310°-350° F. The economizer heats the boiler BU feedwater, by conventional connections not shown, and air preheater AP preheats combustion air supplied to boiler BU by conventional connections not shown. In some installations an economizer or air preheater might not be used. The economizer (and or air preheater) may cool the flue gas to a temperature of the order of 350° F. but not to a temperature substantially lower than say 305° F., or else condensation of sulfur products will seriously damage the economizer (and/or air preheater). The acid dewpoint, or precise gas temperature at which acid will begin to form, depends upon the amount of sulfur trioxide in the flue gas. In FIG. 1 the flue gas is assumed to exit from preheater AP at 305° F.

While the invention will be decreased in connection with scrubbing flue gas from a coal-fired boiler, it should be recognized that it also will be applicable to flue gas from oil-fired boilers if future pollution control regulations require scrubbing of such flue gas. The flue gas exiting from air preheater AP is shown connected via duct 10 to a reheating scrubber system shown in dashed lines at SS, and in many applications the flue gas from boiler BU will be connected in parallel to a plurality of such reheating scrubber systems.

The flue gas in duct 10 is shown passed via blower BL downwardly through the gas passage of hot side heat exchanger HE1 to heat water being circulated through that heat exchanger. In some installations use of a blower may be unnecessary. Heat exchanger HE1 comprises a form of heat exchanger disclosed in my above-mentioned copending application, the disclosure of which is incorporated herein by reference.

In brief, a plurality of metal tubes having fluoroplastic (e.g. Teflon) corrosion protection coverings extend substantially horizontally through a gas passage housing in rows at a plurality of different levels, extending through spaced-apart tube sheets which form walls of the housing. The thickness of the fluoroplastic coverings on the tubes lies within the range of 2–30 mils and is preferably about 15 mils. The inside walls of the housing are lined with fluoroplastic, with fluoroplastic heat-formed through the holes in the tube sheets through which the tubes extend, and with the fluoroplastic extending through the holes gripping the fluoroplastic coverings on the tubes. The tubes are interconnected by U-bends outside the gas passage housing to provide desired water velocities. Flue gas is preferably injected downwardly through the gas passage housing from above the uppermost row of tubes and removed horizontally from below the lowermost row of tubes, though as indicated in the mentioned copending application, gas flow can instead proceed horizontally or upwardly. A plurality of spray nozzles are provided above the tubes, for periodic spraying of water to wash the tubes. The corrosion protection coverings become subject to damage or material deformation at gas temperatures much above 500° F., and hence economizer EC or preheater AP must supply gas to heat exchanger HE1 at a lower temperature. The heat exchange surface area, and the gas and water flow rates through heat exchanger HE1 are selected so that the flue gas is cooled to approximately 254° F. as it passes through the gas passage of unit HE1. If the water being circulated through heat exchanger HE1 provides tube wall temperatures below the acid dewpoint of the flue gas, such cooling of the gas will result in production of sulfuric acid. In order to remove sulfuric acid and particulates from the inside of unit HE1, the spray nozzles are periodically activated to spray the inside of the unit with water. Because the tubes and inside walls of the heat exchanger HE1 are entirely covered with the fluoroplastic corrosion-protection coverings, they are impervious to corrosion, and mere periodic spraying with water prevents build-up of deposits which otherwise might interfere with heat transfer. The flue gas exiting from hot side heat exchanger HE1 is shown conveyed by duct 11 to a wet scrubber, or spray absorber, SA.

The spray absorber or wet scrubber SA may comprise any of many types of wet scrubber described in Chapter 3 of the above-mentioned handbook. A scrubbing liquor, such as water mixed with calcium carbonate, is sprayed into and thoroughly mixed with the flue gas. The calcium reacts with the sulfur dioxide, thereby removing much of the $SO_2$ from the flue gas. The spray absorber also removes a large amount of particulate matter from the flue gas stream.

The mixing of the aqueous scrubbing liquor with the flue gas cools the flue gas down to the water vapor dewpoint (e.g. 122° F.). Because flue gas at that low a temperature provides inadequate stack bouyancy, it becomes necessary to reheat the gas exiting from absorber SA prior to feeding it to a stack.

It should be noted that the mass flow out of scrubber SA will significantly exceed the mass flow into that device, by reason of injection of the scrubbing liquor into scrubber SA. Thus if the flue gas flow into scrubber SA is 1,542,000 pounds per hour, 56,000 pounds per hour of scrubbing liquor might be injected, providing a total mass flow of 1,598,000 pounds per hour out of scrubber SA. The cold side heat exchanger must heat the total mass flow from scrubber SA.

The scrubbed flue gas leaving the spray absorber at a temperature of say 122° F. in duct 12 is reheated by cold side heat exchanger HE2 up to a temperature of say 170° F. to provide adequate stack bouyancy, and the gas exiting from unit HE2 is connected via duct 13 to stack ST. In many installations the flue gas existing from a plurality of cold side heat exchangers will be piped to a single stack. The heat required to reheat the flue gas is supplied by circulating water between units HE1 and HE2, by means of a circulator pump CP. Water existing from unit HE1 at 240° F. is cooled to 220° F. as it passes through unit HE2.

Cold side heat exchanger HE2 ideally comprises a heat exchanger similar in construction to HE1, with Teflon-covered tubes through which water is circulated. In a typical installation cold side heat exchanger HE2 will have substantially more (e.g. 30% more) heat transfer surface area than hot side heat exchanger HE1, because of the greater mass flow handled by HE2 and the differences between the two log mean temperature differences at which the two heat exchangers operate.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. In flue gas treatment apparatus which includes a first heat exchanger connected to receive flue gas and transfer heat from said flue gas to a liquid, a wet scrubber connected to receive flue gas from said first heat exchanger and to mix a scrubbing liquid with said flue gas to scrub the same, and a second heat exchanger connected to receive scrubbed flue gas from said scrubber and to raise the temperature of said scrubbed flue gas, and means to circulate said liquid between said first and second heat exchangers, wherein said first heat exchanger comprises housing means defining a gas passage, and a plurality of tubes extending through said gas passage, said tubes being covered with corrosion protection coverings and said liquid being connected to pass through said tubes, the heat transfer surface areas of said heat exchangers, the circulation of said liquid between said heat exchangers, and the temperatures of flue gas entering said first heat exchanger and exiting from said second heat exchanger being so related that the temperature of that liquid received by said first heat exchanger is below the acid dewpoint of flue gas entering said first heat exchanger, whereby acid is formed in said first heat exchanger.

2. Apparatus according to claim 1 wherein said corrosion protection coverings comprise a fluoroplastic.

3. Apparatus according to claim 1 wherein said first heat exchanger comprises a pair of spread apart tube sheets forming portions of said housing means, the interior surface of each of said tube sheets being covered with a corrosion protection covering, each of said tubes extending through a respective pair of holes in said tube sheets and being gripped by said coverings on said tube sheets.

4. Apparatus according to claim 2 wherein said coverings have a thickness in the range of 2-30 mils.

5. Apparatus according to claim 1 which includes a third heat exchanger connected to supply said flue gas to said first heat exchanger, said third heat exchanger being operative to cool said flue gas to a temperature which is in between a material deformation temperature of said corrosion protection coverings and the acid dewpoint of the flue gas supplied to said first heat exchanger.

* * * * *